(12) United States Patent
Jensen

(10) Patent No.: US 7,014,767 B2
(45) Date of Patent: *Mar. 21, 2006

(54) WATER OZONATION AND BIOREMEDIATION SYSTEM AND ASSOCIATED METHODS

(75) Inventor: Kyle R. Jensen, Apopka, FL (US)

(73) Assignee: AquaFiber Technologies Corporation, Winter Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/930,699

(22) Filed: Aug. 31, 2004

(65) Prior Publication Data

US 2005/0092677 A1    May 5, 2005

Related U.S. Application Data

(63) Continuation of application No. 10/376,921, filed on Feb. 27, 2003, now Pat. No. 6,783,676.

(60) Provisional application No. 60/361,632, filed on Feb. 28, 2002.

(51) Int. Cl.
*C02F 3/32*    (2006.01)
*C02F 1/78*    (2006.01)
*C02F 1/50*    (2006.01)

(52) U.S. Cl. ............... 210/602; 210/631; 210/170; 210/202; 210/259; 210/764; 210/908

(58) Field of Classification Search ........... 210/602, 210/631, 748, 760, 170, 192, 202, 205, 259, 210/903, 906, 908, 764

See application file for complete search history.

(56) References Cited

U.S. PATENT DOCUMENTS

| 3,794,582 | A | 2/1974 | Lackme et al. |
| 4,141,830 | A | 2/1979 | Last |
| 4,333,263 | A | 6/1982 | Adey |
| 5,015,394 | A | 5/1991 | McEllhenney et al. |
| 5,037,550 | A | 8/1991 | Montagnon et al. |
| 5,078,881 | A | 1/1992 | Augustine et al. |
| 5,131,820 | A | 7/1992 | Jensen |
| 5,194,147 | A | 3/1993 | Augustine et al. |
| 5,364,537 | A | 11/1994 | Paillard |
| 5,389,257 | A | 2/1995 | Todd et al. |
| 5,527,456 | A | 6/1996 | Jensen |

(Continued)

FOREIGN PATENT DOCUMENTS

JP    2-83095    3/1990

(Continued)

OTHER PUBLICATIONS

*Ozone in Water Treatment Application and Engineering*, Cooperative Research Report, American Water Works Association and Compagnie Générale des Eaux, Lewis Publishers, 1991, pp. 31-79, 133-135, 154-157, 254, 273-298.

*Primary Examiner*—Fred G. Prince
(74) *Attorney, Agent, or Firm*—Allen, Dyer, Doppelt, Milbrath & Gilchrist, P.A.

(57) ABSTRACT

A method of treating water includes exposing influent comprising water desired to be treated to ozone in sufficient quantity to disrupt cell walls of undesired microorganisms therein, thereby releasing nutrients from within the microorganisms in a form amenable to bioassimilation. The ozone is further in sufficient quantity to oxidize toxic, humic substances to a form amenable to plant bioassimilation. Aquatic plants are contacted with the ozone-exposed water, the aquatic plants being adapted to remove the released and oxidized nutrients therefrom. Water emerging from the aquatic plants is then again exposed to ozone in sufficient quantity to further purify the water.

14 Claims, 1 Drawing Sheet

U.S. PATENT DOCUMENTS

| | | |
|---|---|---|
| 5,573,669 A | 11/1996 | Jensen |
| 5,591,341 A | 1/1997 | Jensen |
| 5,846,423 A | 12/1998 | Jensen |
| 5,851,398 A | 12/1998 | Adey |
| 5,985,147 A | 11/1999 | Jensen |
| 6,783,676 B1 * | 8/2004 | Jensen ................ 210/602 |

FOREIGN PATENT DOCUMENTS

| | | |
|---|---|---|
| JP | 2-83097 | 3/1990 |
| JP | 3-270793 | 12/1991 |
| JP | 2000-117287 | 4/2000 |
| WO | WO 98/51618 | * 11/1998 |

* cited by examiner

WATER OZONATION AND BIOREMEDIATION SYSTEM AND ASSOCIATED METHODS

CROSS-REFERENCE TO RELATED APPLICATIONS

This application is a continuation of application Ser. No. 10/376,921, filed on Feb. 27, 2003, now issued U.S. Pat. No. 6,783,676, which itself claimed priority to provisional patent application Ser. No. 60/361,632, filed on Feb. 28, 2002.

FIELD OF INVENTION

The present invention generally relates to water purification systems and methods, and, in particular, to such systems and methods for using a combination of ozonation and bioremediation to achieve at least partial purification.

BACKGROUND

Algae comprise a group of aquatic plants with over 18,000 species and there are many times more aquatic plants growing rooted to the bottom and attached to other plants, floating and a mixture of both. As with terrestrial plants, the primary nutrients carbon, nitrogen and phosphorus, as well as a suite of micronutrients are essential for growth. Algae have developed the ability to exist where nutrients are in very short supply through many complex and unique biological pathways.

The removal of carbon, nitrogen, phosphorus, and the micronutrients has become key to improving the quality of polluted water and restoring ecological balance. It is widely known that many aquatic plants absorb metals beyond their immediate needs, thus bio-concentrating them within plant cells as they remove them from water. Algae and other aquatic plants can take up primary and micronutrients that may be in overabundance, such as carbon, nitrogen, phosphorus, potassium, iron, aluminum, calcium, and other substances and thus can be utilized to remediate an ecosystem. One embodiment for achieving such bioremediation comprises attached algae; in other embodiments any aquatic plant may be used for nutrient uptake that extracts its nutrients from the water.

Bioremediation can occur when water flows over stationary algae or periphyton which, like all plants, require carbon. Periphyton has a higher productivity than any terrestrial plant. As modeled in the partial pressure of gas laws this creates significant consumption of carbon dioxide. Conservatively, 20 times more $CO_2$ (in the form of bicarbonate) is absorbed by periphyton as is absorbed by a mature forest land on an equal area. Significantly higher cell productivity of periphyton greatly affects $O_2$ production producing many times more $O_2$ per unit area.

Water remediation by regularly harvested periphyton has been shown to be 50 to 1000 times higher than constructed wetland systems per unit area. Remediation can occur when water flows over stationary algae taking up macro nutrients (carbon, nitrogen and phosphorus) and micro nutrients, while discharging oxygen as high as three times saturation. This high oxygen and hydroxyl environment has shown to reduce organic sediments by 0.25 meters per year. In long runs periphyton have been shown to increase pH due to carbon uptake to as high as 11. Filtration can occur through adsorption, absorption, physical trapping, and other more complex means.

A system used to effect this uptake is known as a "periphyton filter," the periphyton comprising a culture of a family of fresh, brackish, and/or salt water plants known as "attached algae." Unlike such organisms as free-floating plankton, benthos or attached algae are a stationary community of epiphytes that will grow on a wide variety of surfaces. When occurring in the path of flowing water, the stationary algae and associated organisms remove nutrients and other compounds from the passing water, while absorbing carbon dioxide and releasing oxygen as a result of respiration, in turn a result of photosynthesis. Once an algal colony or community is established, roots or holdfasts cover the culture surface. If the plant bodies are harvested, leaving the roots behind, the nutrients and other pollutants contained in the plant bodies are removed from the water. Trapped in and around plant biomass nutrients can be exported continuously from a water stream, causing a natural filtration effect.

A further advantage to this technique is that the enriched algae can be harvested and used as a fish or animal feed or as another type of fiber source, which serves to return the nutrients to the food chain.

Studies in algal turf and periphyton filtration are known in the art. Algal turf techniques have been disclosed in Adey's U.S. Pat. No. 4,333,263, and the present inventor's U.S. Pat. Nos. 5,131,820; 5,527,456; 5,573,669; 5,591,341; 5,846,423; and 5,985,147, the disclosures of which are incorporated hereinto by reference.

Periphyton filters (PF) have potential for use in a variety of applications. For example, the periphyton can be used to replace biological or bacterial filters in aquaria as pioneered by Stork and developed by Adey. As mentioned, natural periphyton can be used to remove nutrients and other contaminants from polluted waters. In addition, by harvesting the algal mass, various processes can be used to produce a biomass energy source such as methane or ethanol, fertilizer, a human or animal food additive or supplement, cosmetics, or pharmaceuticals.

The high productivity of the algae in a fibrous form has also yielded uses in the paper and paper products industry, as the harvested algae are many times stronger and easier to process than wood fiber. The limiting factor in many paper production lines is wet strength. Algal fibers can have exceptional wet strength, which can enhance paper production rates while removing nutrients from the paper plant waste stream thus enhancing the environmental preferability of a product. Most paper plants produce high-nutrient waste streams which can be greatly enhanced by periphyton culture systems while producing cleaner water outflow and fiber which can be used to enhance the products manufactured by the plant. This capability has resulted in an economically, socially, and environmentally sustainable method of managing human impact on aquatic ecosystems.

Aquatic plants can be used for hydroseeding, concrete form liners, plaster form liners, ceiling tiles, moldings, architectural details and ornaments, paper backing for gypsum board, building panels, molded pulp packaging, agricultural pots and planters, erosion control products, body panels, and other items.

Triatomic oxygen or $O_3$ (ozone) is a naturally occurring gas created by the force of corona discharge during lightning storms or by UV light from the sun. $O_3$ occurs in an upper atmospheric layer and is critical to the temperature balance on Earth. $O_3$ in the lower atmosphere is viewed as a pollutant; however, man-made $O_3$ systems are fitted with simple destruction technology that completely eliminates concerns about $O_3$ use by man. Such systems are widely used for drinking and wastewater treatment as well as air filtration with doses bearing healthy safety factors.

$O_3$ is 1.5 times as dense as oxygen and 12.5 times more soluble in water and at high doses leaves substantially no residuals or byproducts except oxygen and a minimal amount of carbon dioxide, trace elements, and water. It can be manufactured from dry air or from oxygen by passing these gases through an electric field of high potential sufficient to generate a corona discharge between the electrodes. This corona discharge is just under the energy level of an automotive spark plug. Ultraviolet light and shorter-wavelength radiation also causes oxygen to undergo conversion to $O_3$, which may be used for industrial wastewaters (Belew, 1969). $O_3$ is a more potent germicide than hypochlorous acid by factors of 10–100-fold and disinfects 3125 times faster than chlorine (Nobel, 1980).

$O_3$ is highly unstable and must be generated on site. The measure of an oxidizer and its ability to oxidize organic and inorganic material is its oxidation potential (measured in volts of electrical energy). The oxidation potential of $O_3$ (−2.07 V) is greater than that of hypochlorous acid (−1.49 V) or chlorine (−1.36 V), the latter agents being widely used in water treatment practice at present.

SUMMARY OF THE INVENTION

The present invention relates to systems and methods for improving water quality, and, more particularly, to such systems and methods for bioremediating water with an attached algal colony or other aquatic plants and, most particularly, to treating water against toxic compounds, microorganisms, and other water-borne pollutants in concert with an attached algal colony or other aquatic plants in concert with introduction of ozone ($O_3$) into the water to be treated.

A residence time is required for the ozone gas in the water to contact and oxidize substances therein. Typically this is done with large mixing chambers and mixing pumps. Many times the site of a periphyton filter is some distance from the water to be treated. With mixing occurring just downstream of the supply pump or pipe entrance at single or multiple static mixers, integration can be included in the pipe and then the residence time in the pipe allows for treatment as the water travels to the periphyton filter. This extended contact time can provide increased treatment. Multiple static mixers and ozone injection points may be employed for optimum efficiency. Economical covered ponds can also be used to increase contact time.

Pumping water down a feed tube within a larger fully encased well with a closed bottom and then injecting ozone at the bottom of the well, where the pressure is at maximum, may also enable better dispersion in the water column. As the water rises up the well, necessary contact time is provided between the ozone and substances in the water.

As set forth in the present invention, combining ozone and periphyton filtration provides many advantages over use of either technological approach separately. Ozone breaks down cells to release bound nutrients into the water, preparing them for fast uptake by periphyton. Treatability studies on the phenomenon have been executed on several Central Florida lakes. Lake Apopka, for example, has a very high standing crop of phytoplankton. At the east side of Lake Apopka, water measures 2 ppb SRP (soluble reactive phosphorus) and 352 ppb TP (total phosphorus). After a 1 mg/l dose ozone was applied to this water the SRP was raised to 147 ppb. The rise in reactive nutrients provides superior water for aquatic plant culture and an improvement in water quality. This is largely due to the oxidation of plankton and bacteria cell walls and the spilling of those cells' cytoplasm, containing reactive nutrients, into the water.

Toxic cyanobacteria pose a particularly challenging set of elimination challenges in that the toxins may exist both inside and outside the algal cell. While ozone can be used to detoxify such substances in both cases, the periphyton filter also has a detoxifying capability. As the present inventor described in U.S. Pat. Nos. 5,527,456; 5,573,669; and 5,591,341, water passing across attached algal cultures experienced an increase in pH owing to the removal of significant quantities of carbon by the algae. Algae remove carbon, nitrogen, and phosphorus as a macronutrients and many other elements and compounds as micronutrients. The removal of carbon, a mild acid, causes a rise in the number of ($OH^+$) hydroxyl ions, as typically measured logarithmically as a rise in pH. This environment is aggressive to other compounds such as the algal toxins released by cyanobacteria. Thus a synergistic combination of ozone pre- and post-treatment, to destroy toxins and make available bound nutrients for periphyton along with periphyton to produce a hostile environment via production of hydroxyl ions, work together to both detoxify and denutrify source waters.

Recirculation loops within combined systems can enhance water treatment because the ozonation process is enhanced in waters with increased pH. In this embodiment water that has experienced an increase in pH via a periphyton filter or other plant filtration system can then be exposed to ozonation with enhanced effectiveness owing to the pH increase mediated by aquatic plants.

Carbon that has been activated can bind toxins and other substances. Even further, ultraviolet light can be used to reduce all ozone in effluent to preclude oxidation of aquatic plants. After water has been treated by ozone and periphyton filtration, activated carbon can be used to polish the water.

Ozone used prior to, during, and after filtration using periphyton and other aquatic plants has several synergistic effects.

1. Ozone breaks up planktonic algae in lake waters, making the nutrients available for growth of periphyton and removal from water.

2. After the nutrients are available and removed by the periphyton, the water can be returned to the water body in such a state that toxic algae cannot re-grow, thus effecting enhanced remediation.

3. Ozone destroys certain forms of toxic compounds found in cyanobacteria (blue-green algae), recently found to be dangerous to humans and other animals. These toxic compounds as well as the non-toxic compounds are then available for incorporation into filamentous algae grown for use in industries such as the paper products industry.

4. Ozone destroys both micro-invertebrates and their eggs, which often settle, hatch, and grow as they consume desirable periphyton, discharging nutrients and reducing the effects of filtration.

5. Use of innovative static mixing technology can be implemented such as that used by Wesffall and KOMAX corporations.

6. Use of covered ponds and supply pipes for increased ozone contact time.

7. Use of chased wells for ozone injection provides enhanced ozone treatment due to higher pressure at the well bottom.

8. Periphyton filtration and ozone in sequence or with recirculation can provide enhanced treatment by enhanced pH/ozone performance.

9. Activated carbon filtration for post-treatment polishing of ozone periphyton treated water.

These treatment steps described herein can be used prior to aquifer recharge and storage.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained and advantages offered, by the present invention will become more fully apparent as the description that now follows is read in conjunction with the accompanying drawing.

DETAILED DESCRIPTION OF THE PREFERRED EMBODIMENT

Figure 1:
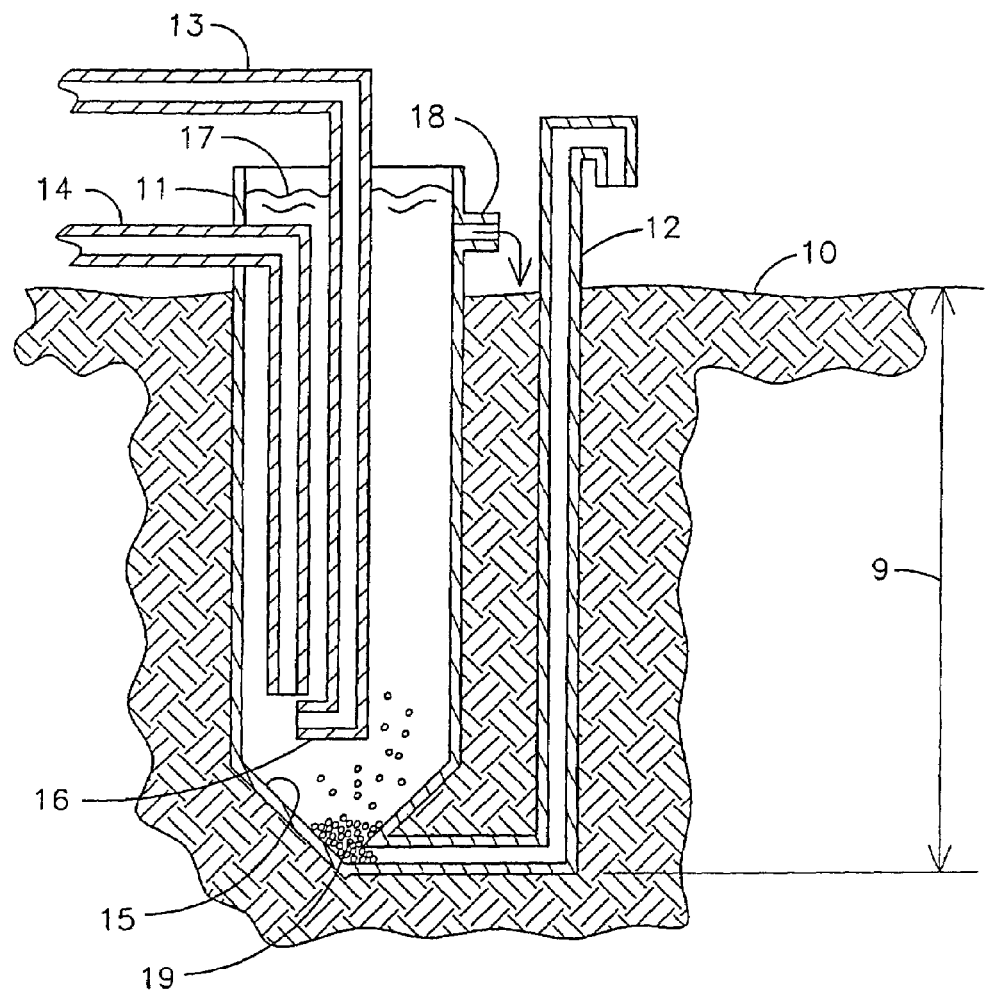
FIG. 1 is a side cutaway view of an ozone contact chamber which may be employed to treat large flows.
Figure 2:
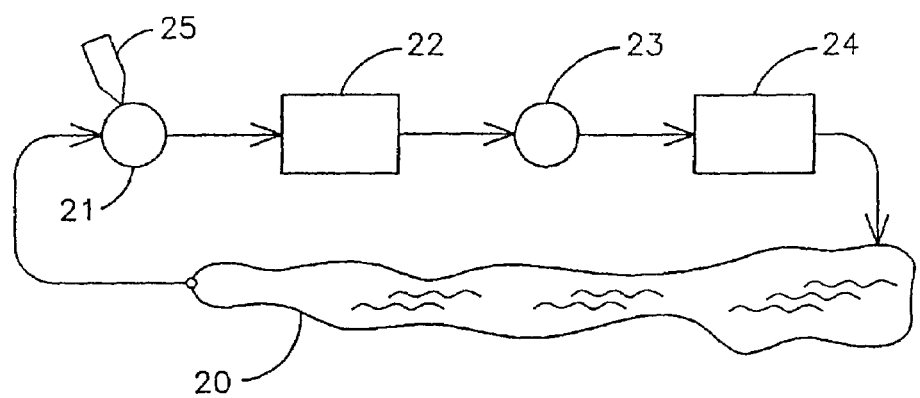
FIG. 2 is a schematic diagram of a water treatment train combining ozone and periphyton filtration in the present invention.

A description of the preferred embodiments of the present invention will now be presented with reference to FIGS. 1 and 2.

Referring to FIG. 1, an economical and efficient ozone contact chamber particularly suited to large-scale applications is illustrated. A tall cone bottom treatment tank 11 of depth 9 is installed in sandy soil 10 by either full excavation or by mixing polymer in the sand in situ and than pumping out said sand while the tank settles in place and is filled with water for ballast. This method is typically used for large power pole concrete footings by Florida Power Corporation. A main flow pipe 14 carries water to be treated to the vessel bottom 15. A side stream pipe 13 carries ozone-laden water to pipe discharge 16 where the ozone-laden water mixes with mainstream water. Water progresses up the tank vertically at a slow rate, allowing for necessary contact time for desired level of oxidation by ozone to the surface 17, whereat it is discharged out the nozzle 18 for nutrient removal downstream. Any precipitates falling to the bottom of tank 11 are evacuated by sediment line 12.

FIG. 2 illustrates an embodiment of the method of the present invention. A lake or other water body 20 from which water is drawn and supplied to an ozone treatment system 21 as depicted in FIG. 1. Chemical flocculation or ultraviolet treatment systems 25 may be used to pre-treat water to be ozone exposed to enhance ozone treatment. Ozonated water is then fed to a plant uptake system such as a periphyton filter 22 or other aquatic plant system. If it is necessary to treat the water further, the process can be repeated in a second ozone system 23 and a second periphyton filter 24 before returning the treated water to the lake or water body 20.

Although only a few embodiments of the present invention have been described in detail hereinabove, all improvements and modifications to this invention within the scope or equivalents of the claims are included as part of this invention.

Having now described the invention, the construction, the operation and use of preferred embodiments thereof, and the advantageous new and useful results obtained thereby, the new and useful constructions, and reasonable equivalents thereof obvious to those skilled in the art, are set forth in the appended claims.

What is claimed is:

1. A method of treating water comprising the steps of:
   (a) exposing influent comprising water desired to be treated to ozone in sufficient quantity to disrupt cell walls of undesired microorganisms therein, thereby releasing nutrients from within the microorganisms in a form amenable to bioassimilation, the ozone further in sufficient quantity to oxidize toxic, humic substances to a form amenable to plant bioassimilation;
   (b) contacting aquatic plants with the ozone-exposed water, the aquatic plants adapted to remove the released and oxidized nutrients therefrom; and
   (c) exposing water emerging from the aquatic plants to ozone in sufficient quantity to further purify the water.

2. The method recited in claim 1, wherein step (a) comprises the steps of injecting ozonated water into a bottom of a vessel, injecting the water to be treated into the vessel bottom, thereby placing the ozone-exposed water under pressure, permitting the ozone-exposed water to rise to a top of the vessel, and transporting the ozone-exposed water from the vessel top to the aquatic plants.

3. The method recited in claim 1, further comprising the step, prior to step (a), of pretreating the influent with a chemical flocculant to precipitate out at least a portion of the excess nutrients.

4. The method recited in claim 3, wherein step (a) and the pretreating step are carried out in a unitary vessel, and further comprising the step, following the pretreating step, of removing precipitate from a bottom of the vessel.

5. The method recited in claim 1, further comprising the step, prior to the water-exposing step, of generating ozone by at least one of exposing air to ultraviolet radiation and creating a corona discharge.

6. The method recited in claim 1, wherein the water-exposing step comprises pumping the water into a bottom end of a tube, injecting ozone adjacent the bottom end of the tube, and permitting the water and the ozone to mix while rising toward a top end of the tube across a pressure gradient.

7. The method recited in claim 1, further comprising the step of passing the water through an activated carbon filter following the contacting step.

8. A system for treating water comprising:
   first means for exposing influent comprising water desired to be treated to ozone in sufficient quantity to disrupt cell walls of undesired microorganisms therein, thereby releasing nutrients from within the microorganisms in a form amenable to bioassimilation, the ozone further in sufficient quantity to oxidize toxic, humic substances to a form amenable to plant bioassimilation;
   aquatic plants adapted to remove the released nutrients and the oxidized compounds from the ozone-exposed water;

means for directing the ozone-exposed water from the water-exposing means to the aquatic plants; and second means for exposing influent comprising water desired to be treated to ozone in sufficient quantity to further purify the water.

9. The system recited in claim 8, wherein the first exposing means comprises:

a vessel;

an influent line for transporting the influent adjacent a bottom of the vessel;

an ozone line for injecting ozonated water adjacent the vessel bottom, for permitting the influent and the ozonated water to mix while flowing upward in the vessel, thereby forming ozone-exposed water, and wherein:

the means for directing the ozone-exposed water comprises means for transporting water from adjacent a top of the vessel to the aquatic plants.

10. The system recited in claim 8, further comprising means for pretreating the influent with a chemical flocculant to precipitate out at least some of the excess nutrients prior to exposing the influent to ozone in the first exposing means.

11. The system recited in claim 10, wherein the first exposing means comprises a vessel, and the pretreating means is positioned in the vessel, and further comprising means for removing precipitate from a bottom of the vessel.

12. The system recited in claim 8, further comprising an activated carbon filter and means for passing the water through the filter downstream of the aquatic plants.

13. A method of treating water comprising the steps of:
(a) exposing influent comprising water desired to be treated to ozone in sufficient quantity to disrupt cell walls of undesired microorganisms therein, thereby releasing nutrients from within the microorganisms in a form amenable to bioassimilation, the ozone further in sufficient quantity to oxidize toxic, humic substances to a form amenable to plant bioassimilation; and
(b) bioassimilating released nutrients and oxidized toxic, humic, and tannic compounds from the ozonated water; and
(c) raising the pH of the water during the bioassimilating step.

14. A system for treating water comprising:

means for exposing influent comprising water desired to be treated to ozone in sufficient quantity to disrupt cell walls of undesired microorganisms therein, thereby releasing nutrients from within the microorganisms in a form amenable to plant bioassimilation, the ozone further in sufficient quantity to oxidize toxic, humic, substances to a form amenable to plant bioassimilation;

bioremediation means adapted to remove the released nutrients and the oxidized compounds from the ozone-exposed water and to raise the pH of the ozonated water;

means for directing the ozone-exposed water from the water-exposing means to the bioremediation means.

* * * * *